United States Patent
Rostaing et al.

(10) Patent No.: US 7,652,260 B2
(45) Date of Patent: Jan. 26, 2010

(54) PARTICLE DETECTION CIRCUIT COMPRISING BASIC CIRCUITS FORMING SUBPIXELS

(75) Inventors: Jean-Pierre Rostaing, La Cote Saint-Andre (FR); Olivier Billoint, Grenoble (FR); Patrick Audebert, Varces Allieres et Risset (FR); Francis Glasser, Eybens (FR)

(73) Assignee: Commissariat a l'Energie Atomique, Paris (FR)

( * ) Notice: Subject to any disclaimer, the term of this patent is extended or adjusted under 35 U.S.C. 154(b) by 278 days.

(21) Appl. No.: 11/665,545

(22) PCT Filed: Oct. 27, 2005

(86) PCT No.: PCT/FR2005/002694

§ 371 (c)(1),
(2), (4) Date: Apr. 17, 2007

(87) PCT Pub. No.: WO2006/051179

PCT Pub. Date: May 18, 2006

(65) Prior Publication Data

US 2009/0121145 A1    May 14, 2009

(30) Foreign Application Priority Data

Nov. 5, 2004  (FR) .................................. 04 11794

(51) Int. Cl.
*G01T 1/24*    (2006.01)

(52) U.S. Cl. ............................ 250/370.08; 250/370.09
(58) Field of Classification Search ........... 250/370.08, 250/370.09
See application file for complete search history.

(56) References Cited

U.S. PATENT DOCUMENTS

| 6,424,750 | B1 | 7/2002 | Colbeth et al. |
| 6,847,040 | B2* | 1/2005 | Strommer ............... 250/370.09 |
| 7,057,179 | B2 | 6/2006 | Arques et al. |
| 2004/0212708 | A1* | 10/2004 | Spartiotis et al. ............. 348/295 |

FOREIGN PATENT DOCUMENTS

EP    1 424 568 A2    6/2004

* cited by examiner

*Primary Examiner*—Constantine Hannaher
(74) *Attorney, Agent, or Firm*—Oliff & Berridge, PLC

(57) ABSTRACT

The particle detection circuit comprises a plurality of basic circuits. Each basic circuit comprises a particle detector element connected to an associated counter and a summing circuit having a first input connected to the output of the counter. Basic circuits, each forming a subpixel, are grouped together by series connection of their summing circuits to form a pixel. The output of the pixel, formed by the output of the summing circuit of a last basic circuit of the pixel, supplies counting signals representative of the number of particles detected by the set of basic circuits of the pixel. Disabling certain basic circuits of the pixel, by selective zero resetting of the first input of their summing circuit, can enable only the particles detected by certain zones of the pixel to be counted.

10 Claims, 7 Drawing Sheets

PARTICLE DETECTION CIRCUIT COMPRISING BASIC CIRCUITS FORMING SUBPIXELS

BACKGROUND OF THE INVENTION

The invention relates to a particle detection circuit comprising a plurality of basic circuits each comprising a particle detection element connected to associated counting means delivering counting signals representative of the number of particles detected by the corresponding detection element.

STATE OF THE ART

Numerous image formation devices, in particular in the radiology field (radiography, fluoroscopy) use particle (X-ray or gamma photons) detection circuits comprising basic circuits arranged in the form of a matrix of lines and columns and each corresponding to a pixel. Some operate by integrating electrical charges and their operating range is limited, in the downwards direction, by the thermal noise (typically about 100 μV in rms value), and in the upwards direction by the supply voltage (for example about 1 V). Others operate by events counting and are therefore limited by the characteristics of the counter, in particular by its capacity.

As represented in FIG. 1, a conventional detection circuit comprises a detector element 1 transforming the detected particles p into electrical pulses. The output of the detector element 1 is connected, generally by means of a low-noise preamplifier 2, to an input of a comparator 3 having a further input connected to a threshold voltage Vs. The comparator 3 thus supplies a binary signal to the counting input of a counter 4 each time detection of a particle produces a pulse of sufficient amplitude. The counter 4 thus supplies on output binary signals representative of the number of particles detected by the detector element 1. Conventionally, the counter 4 comprises a reset input R. The spatial resolution of the circuit is defined by the pixel, which corresponds to a basic point of the matrix and of the image.

FIGS. 2 to 4 illustrate the temporal behaviour of detection circuits according to the prior art. The output pulses A of the detector element of the detection circuit according to FIG. 1 are represented in FIG. 2, each pulse corresponding to detection of an incident particle. The whole processing chain, from the detector to the counter, requires a processing time $\tau$, linked to the transit time of the carriers in the detector element 1 and to the processing time of the electronic circuits, conventionally called service time or dead time, during which the system is not available. So long as the dead time is $\tau$ is negligible compared with the particle flux $\lambda$, i.e. when $\tau \ll 1/\lambda$, the detection circuit detects all the particles correctly. When the dead time $\tau$ is on the other hand not negligible compared with the particle flux $\lambda$, i.e. when the inequality $\tau \ll 1/\lambda$ is no longer verified, the counting rate, corresponding to the number of incident particles really counted by the counter 4 decreases until it paralyzes the system, as represented in FIG. 3, which represents the output signals B from the comparator 3 of a detection circuit according to FIG. 1 of a paralyzable system. Indeed, if a particle is detected by the detector element 1 during the processing time of detection of the previous particle, the detection circuit ignores the last particle detected. Pile-up then occurs. This phenomenon is more precocious in a paralyzable system (FIG. 3) than in a non-paralyzable system (FIG. 4).

It can be shown that the number m of particles counted is a function of the number n of incident particles and of the dead time $\tau$ introduced by the circuit. Thus, for a paralyzable system $m = n e^{-n\tau}$, whereas for a non-paralyzable system $m = n/(1+n\tau)$. FIG. 5 illustrates the variations of the number m of particles counted as a function of the flux $\lambda$ of incident particles detected by the detector element 1, respectively in a non-paralyzable system (curve C1) and in a paralyzable system (curve C2). The dotted line represents the theoretical case in which all the incident particles detected are counted (m=n).

Document EP-A-1424568 discloses a particle detector with a standard spatial resolution for a medium to strong particle flux and pixel grouping, using logic OR gates arranged upline from the counters associated with the detector elements to increase the signal-to-noise ratio in the case of weak fluxes (image with noise). In the former case the detector is sensitive to the pile-up of events, and in the latter case the spatial resolution is downgraded. In all cases, the dead time is unchanged and the detector does not operate correctly when the particle flux is very high.

OBJECT OF THE INVENTION

The object of the invention is to remedy the shortcomings of known detection circuits, and more particularly to enable detection of high particle fluxes with a good spatial resolution.

According to the invention, this object is achieved by the fact that each basic circuit comprises a summing circuit having first and second inputs and an output, the first input of the summing circuit of a basic circuit being connected to the output of the associated counting means, a preset number of basic circuits constituting a pixel in which the summing circuits are connected in series between an input of the pixel, formed by the second input of the summing circuit of a first basic circuit of the pixel, and an output of the pixel, formed by the output of the summing circuit of a last basic circuit of the pixel and supplying counting signals representative of the number of particles detected by all the basic circuits of the pixel.

According to a development of the invention, each basic circuit comprises selective resetting means of the first input of the corresponding summing circuit.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
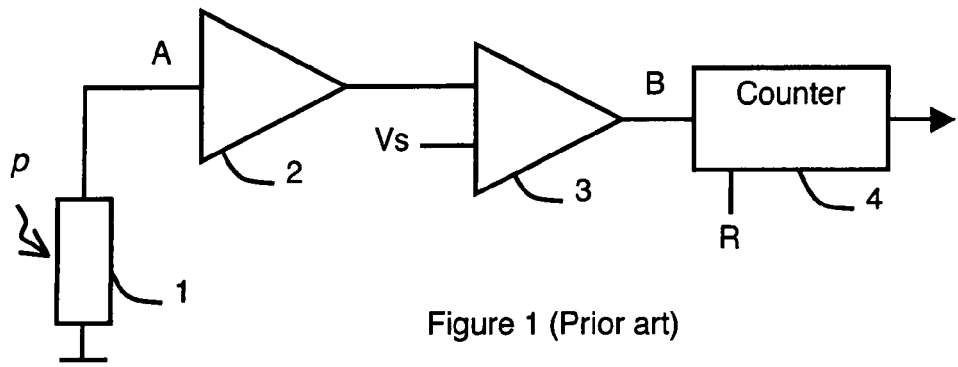
FIG. 1 illustrates a detection circuit according to the prior art.
Figure 2:
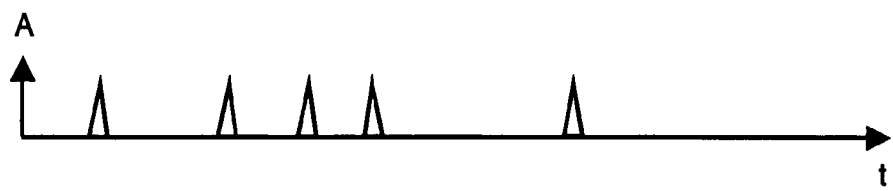
FIGS. 2 to 4 illustrate the signals obtained respectively on output from the detector element (FIG. 2) and on output from the comparator (FIG. 3 for paralyzable systems and FIG. 4 for non-paralyzable systems) of detection circuits according to the prior art.
Figure 6:
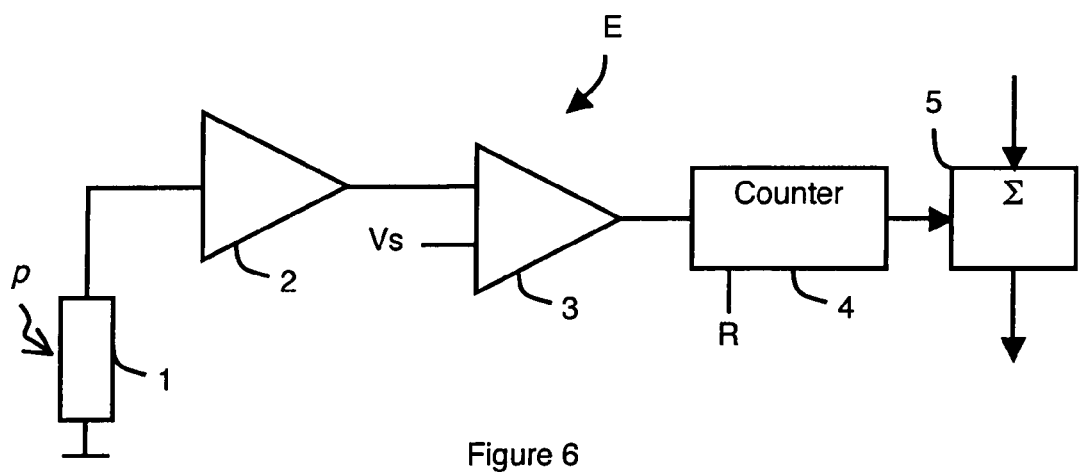
FIG. 6 represents a particular embodiment of a basic circuit of a detection circuit according to the invention.

As represented in FIG. 6, each basic circuit E of a detection circuit according to the invention comprises at least one detector element 1 and a counter 4, preferably connected, as in FIG. 1, by means of a preamplifier 2 and a comparator 3, and also a summing circuit 5, comprising first and second inputs and an output. The counting signals supplied on output of the counter 4 and representative of the number of particles p detected by the corresponding detector element 1 are applied to the first input of the corresponding summing circuit 5.

A detection circuit comprises a plurality of basic circuits E forming a pixel in which the summing circuits are connected in series between an input of the pixel, formed by the second input of the summing circuit 5 of a first basic circuit of the pixel, and an output of the pixel formed by the output of the summing circuit of a last basic circuit of the pixel. The second input of the first basic circuit of a pixel is connected to zero, whereas the second input of the summing circuit 5 of each of the other basic circuits of the pixel is connected to the output of the summing circuit 5 of the previous basic circuit. The output of the summing circuit of the last basic circuit of the pixel then forms the output of the pixel and supplies counting signals representative of the number of incident particles detected by the set of basic circuits E of the pixel.

Figure 7:
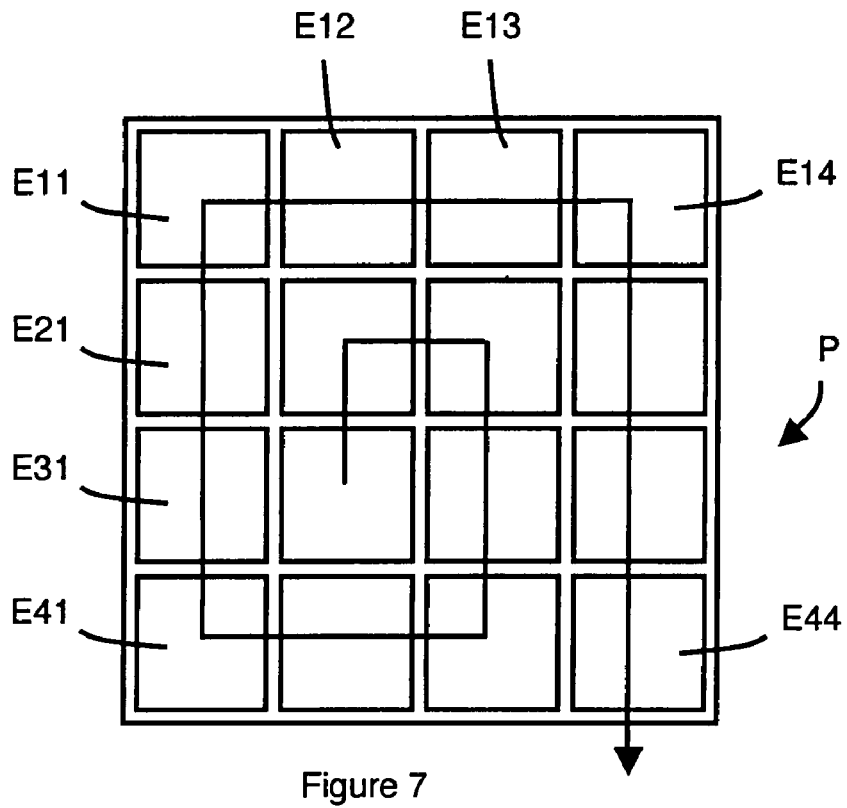
FIGS. 7 and 8 illustrate two examples of series connection of the summing circuits of 16 basic circuits of a pixel of a detection circuit according to the invention.

In FIG. 7, 16 basic circuits form a matrix of 4 lines and 4 columns, each basic circuit Eij being referenced by its line index i and column index j. In the example of FIG. 7, the first basic circuit of the pixel is the basic circuit E32. The output of its summing circuit 5 is connected to the second input of the summing circuit 5 of the last basic circuit E44 of the pixel by means of the summing circuits, connected in series, of the basic circuits E22, E23, E33, E43, E42, E41, E31, E21, E11, E12, E13, E14, E24 and E34, thus forming a spiral path which only passes through each basic circuit E once. The second input of the summing circuit of the basic circuit E32 is connected to zero.

Figure 8:
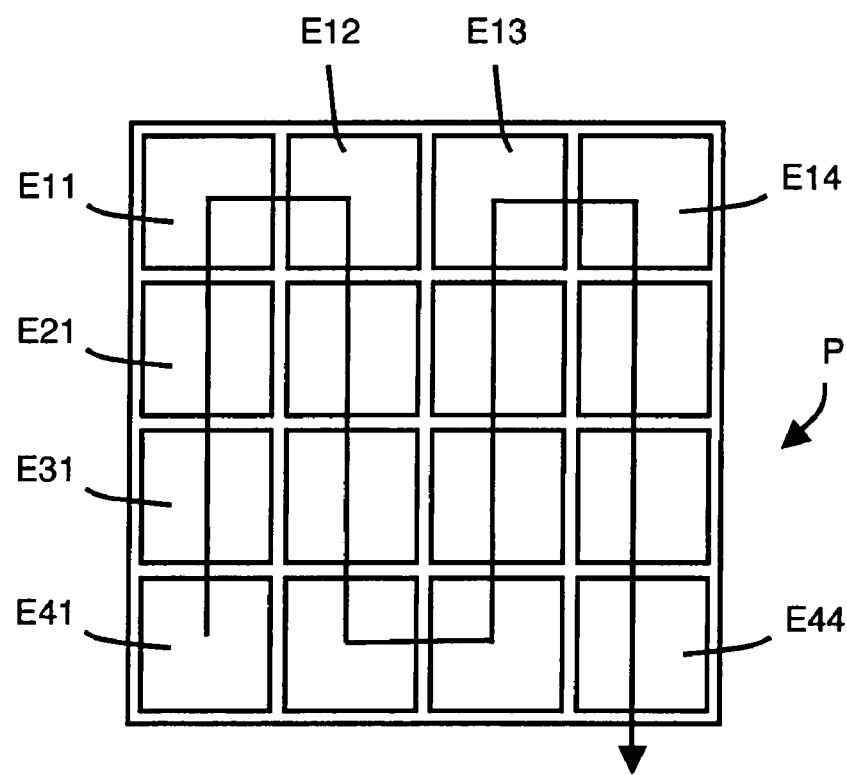

In the alternative embodiment represented in FIG. 8, the first basic circuit of the pixel is the basic circuit E41. The output of its summing circuit 5 is connected to the second input of the summing circuit 5 of the last basic circuit E44 of the pixel by means of the summing circuits, connected in series, of the basic circuits E31, E21, E11, E12, E22, E32, E42, E43, E33, E23, E13, E14, E24 and E34, thus forming another path which only passes through each basic circuit E once. The second input of the summing circuit of the basic circuit E41 is connected to zero.

The path can of course be any path, provided that it only passes once via each of the basic circuits of the pixel. This cascading structure enables all the basic circuits, which form subpixels, to be passed through and the content of all the counters to be added together. The sum of the content of all the counters, representative of the number of incident particles detected by all the detector elements 1 of all the basic circuits considered, is thus obtained on output of the summing circuit of the last basic circuit of the pixel. The set of all the basic circuits thus connected defines a pixel, i.e. a point of the detection circuit which supplies a punctual counting information which can be transferred by a bus and used to constitute a final image. The size of each pixel defines the spatial resolution of the detection circuit and therefore of the final image. To achieve a high spatial resolution, the pixels are of small dimensions and the electronic detection circuit can then be achieved by an Application Specific Integrated Circuit (ASIC).

Figure 3:
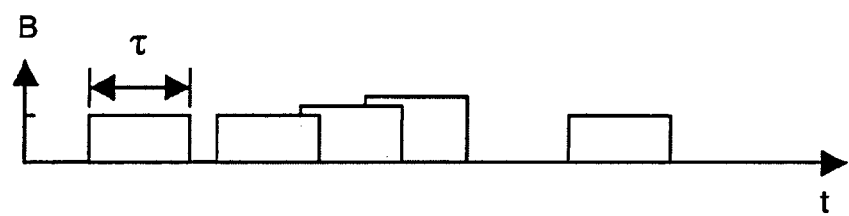
Figure 4:
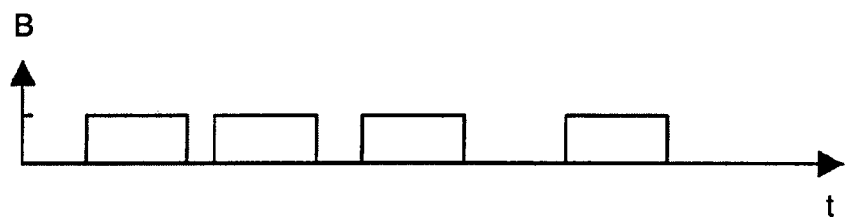
Figure 5:
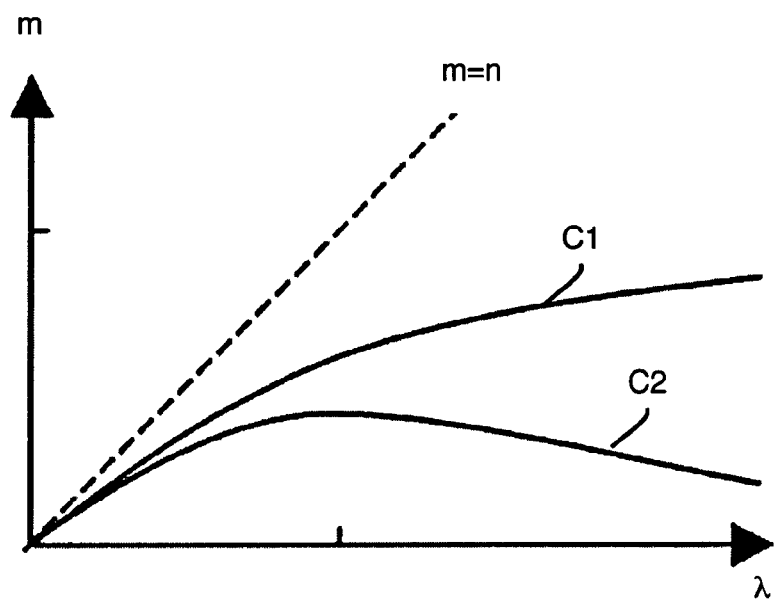
FIG. 5 illustrates the variations of the number m of particles counted versus the flux $\lambda$ of incident particles detected by the detector element in a detection circuit according to the prior art.

Each pixel is thus divided into K subpixels (K=16 in FIGS. 7 and 8). Thus the flux $\lambda$ of particles reaching the pixel is divided by K at the level of each subpixel, i.e. at the level of each basic circuit E, where it is reduced to $\lambda/K$. In each basic circuit E, the dead time $\tau$, linked to the transit time of the carriers in the detector element 1 and to the processing time of the electronic circuits, is to be compared with $K/\lambda$ and no longer with $1/\lambda$. The dead time $\tau$ is thereby more easily negligible, the larger the number K of basic cells constituting a pixel. It is in fact then easier to verify the inequality $\tau \ll K/\lambda$. In practice, everything happens as if the dead time $\tau$ of a pixel that only comprised a single counting channel had been divided by K. This enables the pile-up phenomenon described above in relation to FIGS. 3 and 4 to be considerably delayed.

The resolution of the detection circuit is therefore no longer limited by the particle flux to be managed. Dividing the pixels into subpixels and consequently reducing the size of the basic circuits, that constitute subpixels and not pixels, enables the quantity of pulses to be managed during a given time by each basic circuit to be artificially reduced, for the same spatial resolution. The invention does not however consist only in reducing the pitch of the matrix of basic circuits, but in addition in grouping them together to provide a single signal representative of the initial pixel. Moreover, to overcome the constraints relating to the duration of the pulses, summing is performed from the counting signals delivered by each of the basic circuits. It is in this way possible to measure a much greater particle flux than with known detection circuits, all the more so as the counters 4 of the basic circuits are reset at a rate, for example of about 100 μs, that is much lower than the of duration of the pulses, which is typically about 20 to 30 ns.

Figure 9:
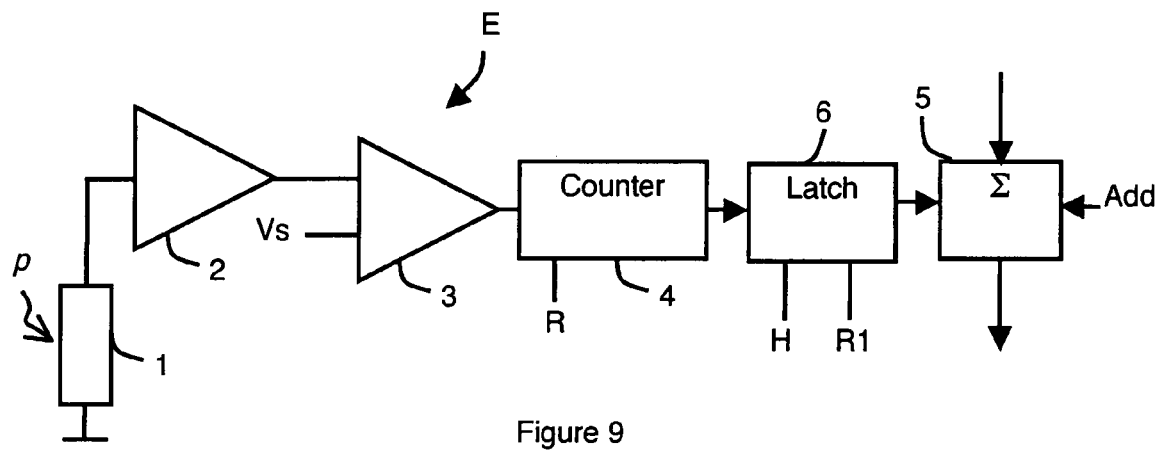
FIG. 9 represents an alternative embodiment of a basic circuit of a detection circuit according to the invention, enabling a part of the basic circuits of a pixel to be selected and the others to be disabled.

In the alternative embodiment represented in FIG. 9, each basic circuit E further comprises a buffer memory 6 connected between the output of the counter 4 and the first input of the corresponding summing circuit 5. The buffer memory 6 preferably comprises a hold input H and a reset input R1. The inputs R, H and R1 are controlled by a central control circuit, not represented. In normal operation, the buffer memory 6 stores the content of the counter 4 and transfers it to the summing circuit 5.

The hold input H enables operation upline and downline from the buffer memory 6 to be separated. Thus, a counting sequence in the basic circuit concerned can resume immediately after the data of the counter 5 have been transferred to the buffer memory 6, independently from the adding sequence in the pixel E. This adding sequence is preferably controlled by addition inputs Add of the summing circuits 5, connected to the central control circuit. The counting dead time can thereby be minimized.

The reset input R1 of the buffer memory 6 for its part enables the content, and consequently the output of the buffer memory 6, to be selectively zero reset. This then results in resetting of the first input of the corresponding summing circuit 5 connected downline. The output signals of this summing circuit 5 are then identical to the signals applied to its second input. This summing circuit 5 is therefore transparent. It is thus possible, by programming, to select, from the basic circuits E of a pixel all the summing circuits whereof are, as previously, connected in series, only a part of these circuits (the input whereof R1 is inactive, i.e. the output of the buffer memory 6 whereof is not reset) and to disable the others (the input R1 whereof is active and causes resetting of the output of the buffer memory 6), which become transparent. The counting signals on output of the pixel then only take into account the particles detected by the selected basic circuits (input R1 inactive) and ignore the particles detected by the transparent basic circuits (input R1 active). The addition path is thereby programmable, disabling of certain basic circuits of the pixel, by selective resetting of the first input of their summing circuit 5, enabling only the particles detected by some zones of the pixel to be counted.

The buffer memory 6 can be achieved by means of a set of memory dots in series or in parallel, depending on the architecture, of the counters 4 and of the summing circuits 5. Each memory dot can for example be achieved by a capacitor preceded by a switch which samples its input on one of the fronts of a binary signal applied to the hold input H. The content of this memory dot can be reinitialized, i.e. reset to logic level zero, by means of a reset signal applied to the reset input R1, without any synchronization constraint.

Figure 10:
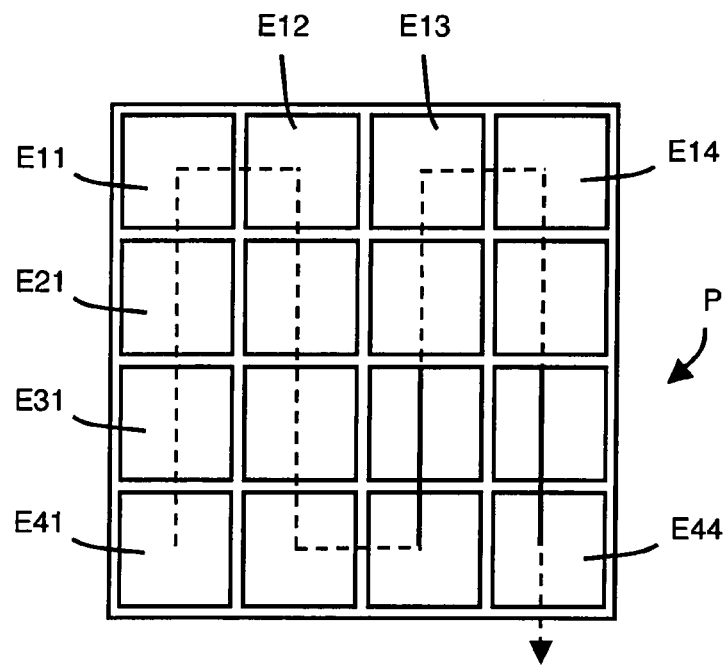
FIGS. 10 and 11 illustrate the selected part of two pixels formed by basic circuits according to FIG. 9.
Figure 11:
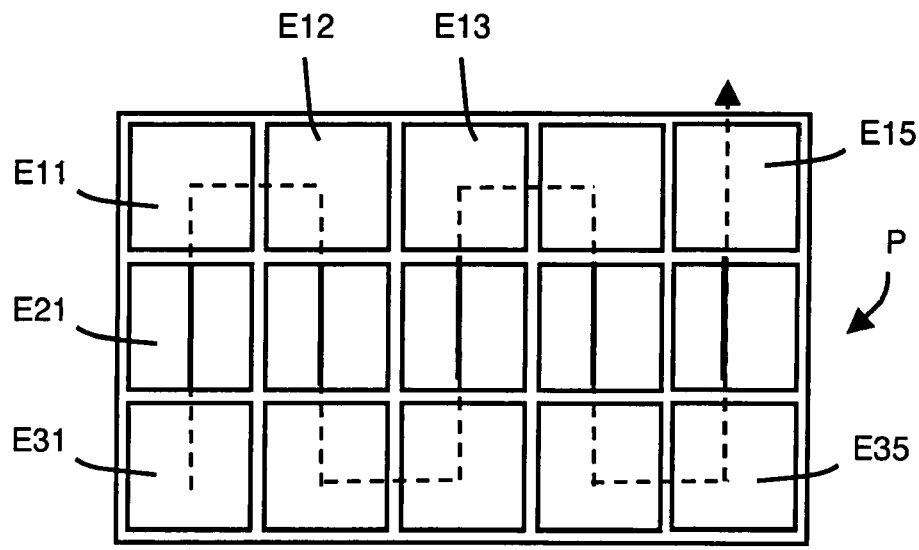

FIGS. 10 and 11 illustrate two pixels formed by basic circuits according to FIG. 9, only a part whereof is selected. The summing path thus comprises a selected part (schematized by unbroken lines in FIGS. 10 and 11) and transparent basic circuits (schematized by dotted lines). For example, the pixel according to FIG. 10 is analogous to the pixel according to FIG. 8, but only the four basic circuits of the bottom right quadrant, E43, E33, E34 and E44, are selected (their inputs R1 are inactive). The reset inputs R1 of the buffer memories of the basic circuits E11, E12, E13, E14, E21, E22, E23, E24, E31, E32, E41 and E42 are active, so as to make the corresponding basic circuits transparent.

The basic circuits of a pixel P can be of any number and arrangement thereof can be of any form. FIG. 11 illustrates for example a rectangular pixel P, formed by 3 lines of 5 basic circuits, thus forming a matrix of 3×5 basic circuits, E11 to E35. The summing path successively connects, in the example represented in FIG. 11, the summing circuits of the basic circuits E31, E21, E11, E12, E22, E32, E33, E23, E13, E14, E24; E34, E35, E25 and E15. To observe only the central line of the pixel, only the basic circuits E21, E22, E23, E24 and E25 of the central line of the pixel are selected (inputs R1 inactive), all the other basic circuits (E11, E12, E13, E14, E15, E31, E32, E33, E34 and E35) being rendered transparent by activation of the corresponding inputs R1.

Figure 12:
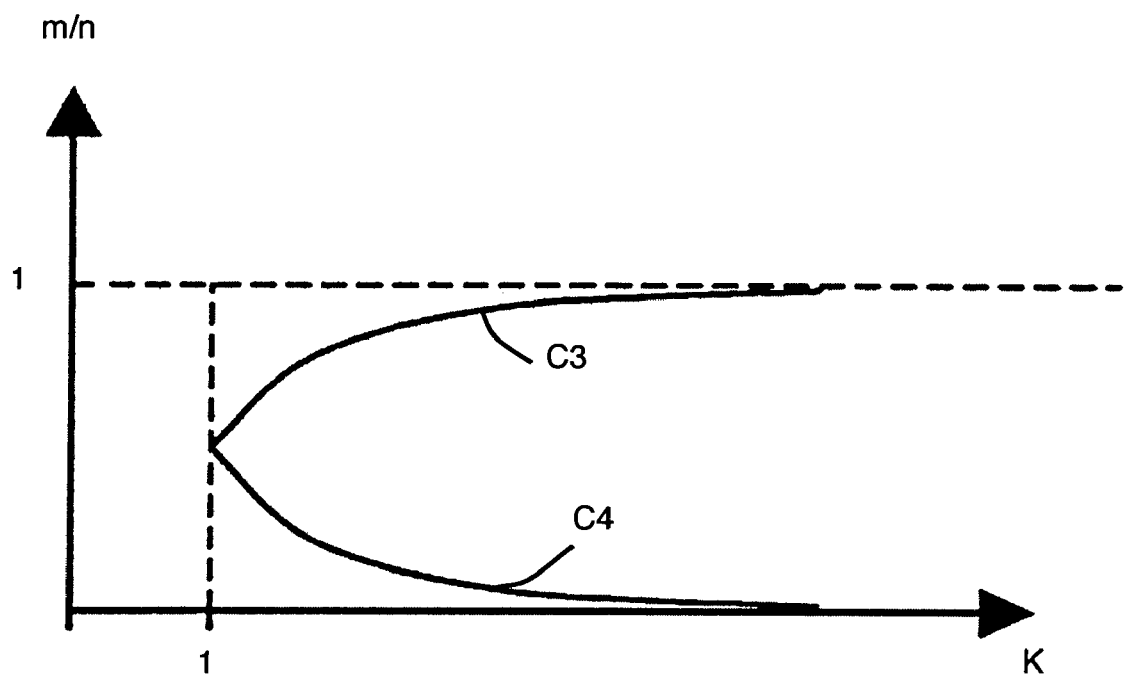
FIG. 12 illustrates the variations of the ratio m/n between the number m of particles counted and the number n of incident particles, versus the number K of basic cells of a pixel, respectively with a detection circuit according to the invention (curve C3) and with a detection circuit according to document EP-A-1424568 (curve C4).

The efficiency of counting of a detection circuit according to the invention is illustrated in FIG. 12. The curve C3 represents the variations of the ratio m/n between the number of particles counted and the number of incident particles, versus the number K of basic cells of a pixel, in a detection circuit according to the invention. This curve shows that the efficiency of the counting increases with the number of subpixels of a pixel, unlike what happens for a group of pixels in a detection circuit according to document EP-A-1424568 (curve C4).

Moreover, in the detection circuit described above, summing of the particles downline from the counters 4 gives each subpixel the same weight in the final sum, which thus constitutes a uniform sum of the fluxes received by the different basic cells of any one pixel.

On the contrary, in the above-mentioned document, summing of the number of particles detected by a group of pixels is performed by means of a logic OR gate arranged directly at the output of the comparator of each pixel, i.e. upline from the corresponding counter. This causes an increase of the flow rate as the downline pixel is approached. This phenomenon progressively masks taking account of detection of particles originating from the downline pixels as compared with the upline pixels. The final result is therefore a weighted sum of the fluxes received by the different pixels, to which decreasing coefficients are assigned, from upline to downline In known manner, it may be desirable to group a certain number of pixels together. It is then possible to go from a detection circuit in which all the pixels are independent to a detection circuit in which a certain number of pixels are connected in series. In this case, the spatial resolution of the detection circuit is reduced accordingly.

Figure 13:
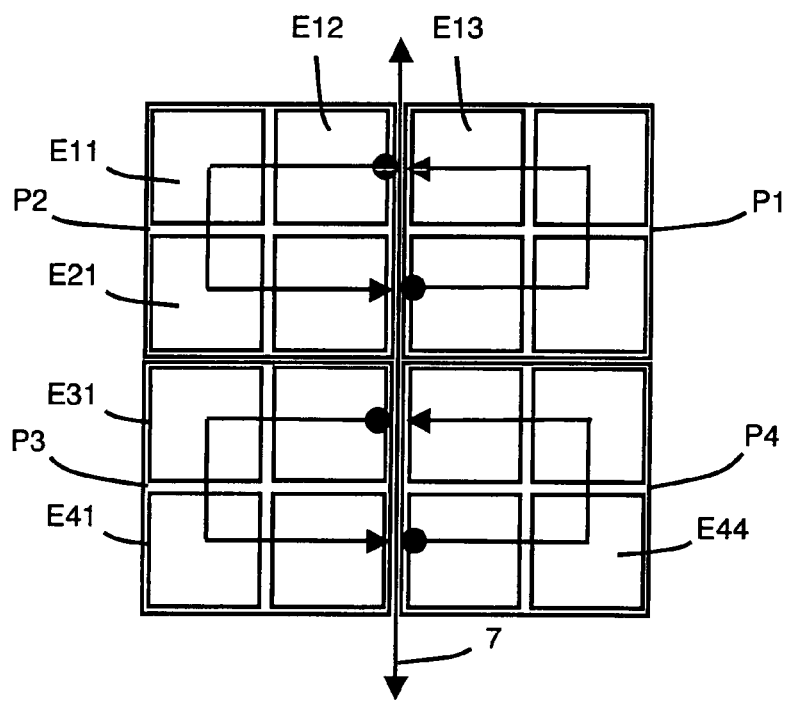
FIG. 13 represents a particular example of arrangement of 4 pixels of 4 basic circuits of a detection circuit according to the invention enabling two spatial resolutions to be defined, going from single to quadruple.

In FIG. 13, four independent pixels P1 to P4 are arranged on each side of a bus 7. The input of each pixel (schematized by a dot) is, as previously, connected to zero, whereas its output (schematized by an arrow) is connected to the bus 7. In a preferred embodiment, to adapt to the particle flux and to go from one resolution to the other, the detection circuit is equipped with switches 8, controlled by the control circuit, not represented, thus enabling the different pixels to be connected at will. The summing path inside each pixel is preferably such that the input and output of the pixel are both arranged on the same side, or access side, of the pixel, near the central bus 7. Thus, in FIG. 13, the inputs and outputs of the pixels P2 and P3 are all aligned in the column 2, on the left of the bus 7, whereas the inputs and outputs of the pixels P1 and P4 are all aligned in the column 3, on the right of the bus.

Figure 14:
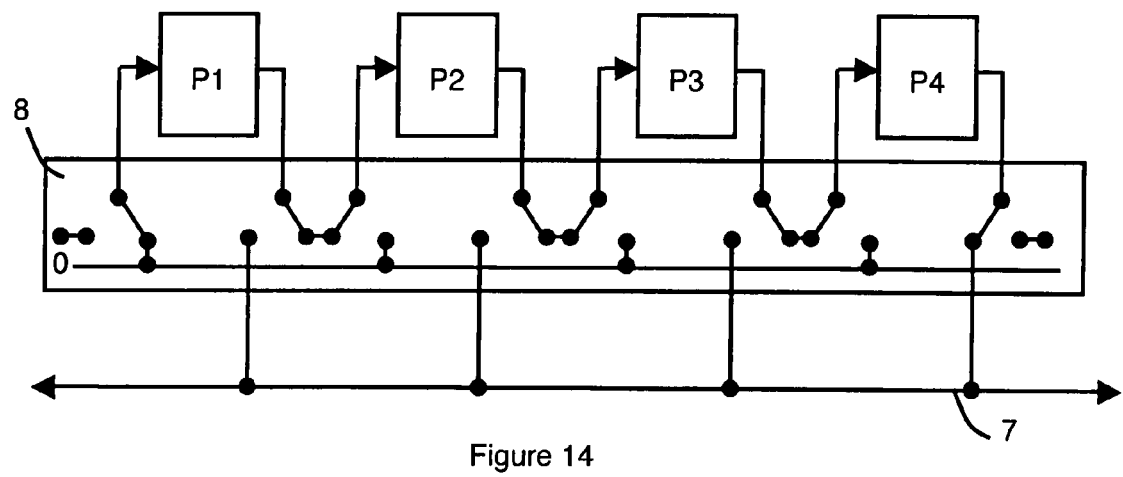
FIG. 14 schematically illustrates the electrical connections of the inputs and outputs of the pixels of the circuit according to FIG. 13.

As illustrated in FIG. 14, switches enable the input of each pixel to be selectively connected to zero or to the output of the previous pixel and other switches enable the output of each pixel to be selectively connected to the bus 7 or to the input of the next pixel. In the example illustrated in FIG. 14, the input of the pixel P1, constituting the input of the group of pixels, is connected to zero, whereas the output of the pixel P4, constituting the output of the group of pixels, is connected to the bus 7. At the same time the outputs of the pixels, P1, P2 and P3 are respectively connected to the inputs of the next pixels P2, P3 and P4. The spatial resolution of the group is then equal to one quarter of the spatial resolution of the detection circuit according to FIG. 13, constituted by 4 independent pixels.

Figure 15:
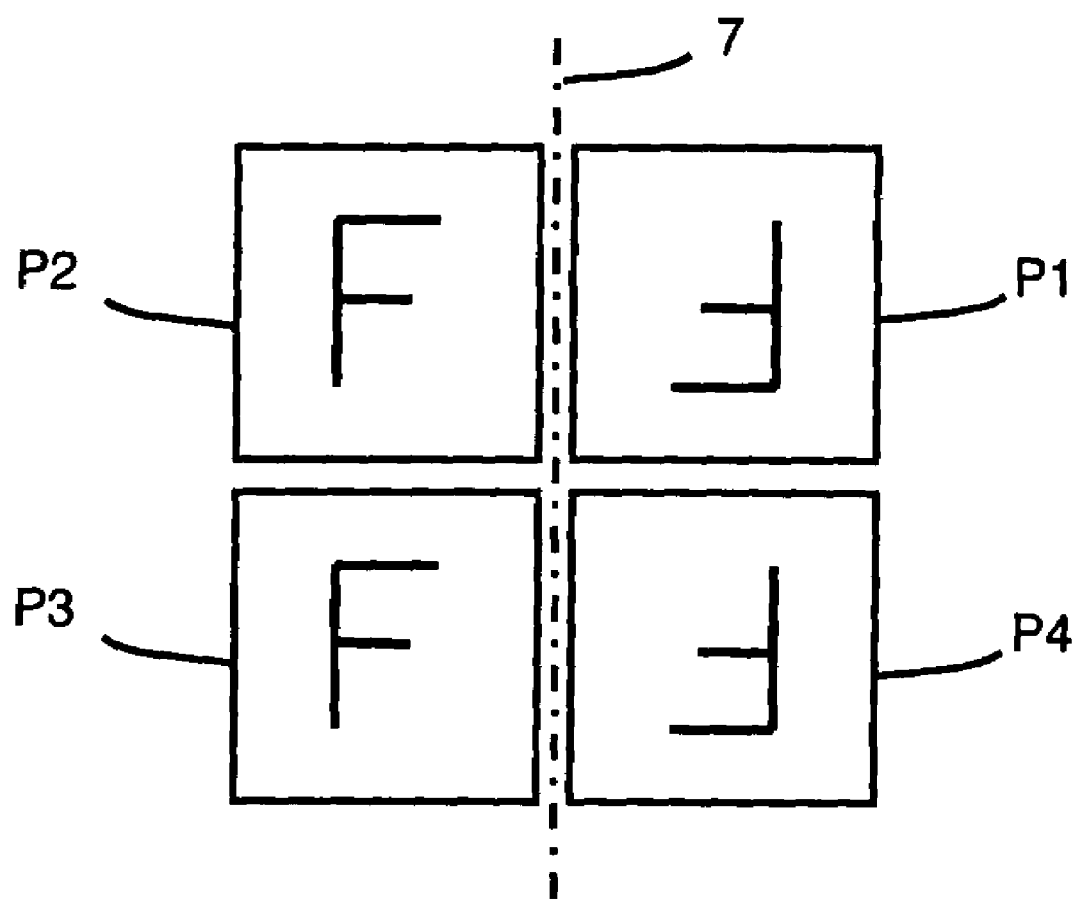
FIG. 15 represents a particular embodiment of arrangement of 4 pixels of a detection circuit according to the invention.

A suitable arrangement of four pixels P1 to P4 enabling to go from a standard resolution in which all the pixels are independent to a grouping of pixels having a reduced resolution is represented in FIG. 15. N being an even number, the four pixels (P1 to P4), each having N/2×N/2 basic circuits, are arranged on each side of the bus 7. The set thus forms a square of $N^2$ basic circuits. The four pixels can be independents or grouped, by switches 8, to form a grouping of pixels of reduced resolution.

More generally, several pixels can be arranged in the form of a matrix that is symmetrical with respect to the bus 7. In FIGS. 13 and 15, the pixels P2 and P3 are arranged respectively at the top and at the bottom on the left of the bus 7, whereas the pixels P1 and P4 are arranged respectively at the top and at the bottom on the right of the bus 7. The series connection between the summing circuits 6 of the basic circuits E of a pixel P defines the summing path of the pixel. In FIG. 15, the summing path of the pixel P3 (represented schematically by an F) is obtained by translation, in a direction parallel to the bus 7, of the summing path of the pixel P2 and vice-versa. The summing paths of the pixels P1 and P4 (represented schematically by an upside-down F) are obtained by rotation through 180°, respectively from the pixels P2 and P3. In a general manner, the summing path of a pixel of the matrix can be obtained by translation, axial symmetry or rotation through 180° from the summing path of another pixel of the matrix. This symmetry particularly enables fabrication of a detection circuit comprising a large number of pixels to be simplified and the spatial resolution of the circuit to be modified depending on requirements.

The detection circuit according to the invention can be used in any type of pixellated imaging system, in particular with multiple spatial resolution. It is more particularly designed to be used when the particle flux is high ($\lambda \sim 1/\tau$) and obtaining a minimum loss rate is a priority (medical imaging systems) or when the flux is low ($\lambda \ll 1/\tau$) and achieving a minimum dead time is of the utmost importance (astrophysics).

The invention claimed is:

1. Particle detection circuit comprising a plurality of basic circuits each comprising a particle detection element connected to associated counting means delivering counting signals representative of the number of particles detected by the corresponding detection element, each basic circuit comprising a summing circuit having first and second inputs and an output, the first input of the summing circuit of a basic circuit being connected to the output of the associated counting means, a preset number of basic circuits constituting a pixel in which the summing circuits are connected in series between an input of the pixel, formed by the second input of the summing circuit of a first basic circuit of the pixel, and an output of the pixel, formed by the output of the summing circuit of a last basic circuit of the pixel and supplying counting signals representative of the number of particles detected by all the basic circuits of the pixel.

2. Circuit according to claim 1, wherein each basic circuit comprises selective resetting means for reset of the first input of the corresponding summing circuit.

3. Circuit according to claim 2, wherein the resetting means comprise a buffer memory connected between the output of the counting means and the first input of the corresponding summing circuit, and a resetting input for reset of said buffer memory.

4. Circuit according to claim 1, comprising switching means designed to selectively connect the input of a pixel to zero or to the output of a previous pixel.

5. Circuit according to claim 4, comprising switching means designed to selectively connect the output of a pixel to a bus or to the input of the next pixel.

6. Circuit according to claim 1, wherein the input of a pixel is connected to zero, whereas its output is connected to a bus.

7. Circuit according to claim 5, wherein at least two pixels are connected in series by the switching means between zero and said bus.

8. Circuit according to claim 1, wherein, the basic circuits of a pixel being arranged in the form of a matrix of lines and columns, the input and output of a pixel are arranged on the same access side of the pixel.

9. Circuit according to claim 1, wherein, N being an even number, four pixels, each comprising N/2×N/2 basic circuits, are arranged on each side of a bus.

10. Circuit according to claim 1, comprising a plurality of pixels arranged in the form of a symmetrical matrix with respect to a bus, and in that the series connection between the summing circuits of the basic circuits of a pixel defining a summing path of the pixel, the summing path of a pixel is obtained by translation, axial symmetry or rotation through 180° from the summing path of another pixel.

* * * * *